US012012127B2

(12) United States Patent
Das et al.

(10) Patent No.: US 12,012,127 B2
(45) Date of Patent: *Jun. 18, 2024

(54) TOP-DOWN VIEW OBJECT DETECTION AND TRACKING

(71) Applicant: Zoox, Inc., Foster City, CA (US)

(72) Inventors: Subhasis Das, Menlo Park, CA (US); Benjamin Isaac Zwiebel, Burlingame, CA (US); Kai Yu, Burlingame, CA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 488 days.

This patent is subject to a terminal disclaimer.

(21) Appl. No.: 16/779,576

(22) Filed: Jan. 31, 2020

(65) Prior Publication Data

US 2021/0181758 A1   Jun. 17, 2021

Related U.S. Application Data

(60) Provisional application No. 62/926,423, filed on Oct. 26, 2019.

(51) Int. Cl.
  *B60W 60/00* (2020.01)
  *G01S 13/89* (2006.01)
  (Continued)

(52) U.S. Cl.
  CPC ......... *B60W 60/0027* (2020.02); *G01S 13/89* (2013.01); *G01S 13/931* (2013.01);
  (Continued)

(58) Field of Classification Search
  None
  See application file for complete search history.

(56) References Cited

U.S. PATENT DOCUMENTS 9,731,729 B2   8/2017 Solyom et al.
10,106,153 B1 * 10/2018 Xiao ........................ G08G 1/14
(Continued)

FOREIGN PATENT DOCUMENTS

CA        3067573 A1 *  7/2020
WO    WO2018156451 A1    8/2018
WO    WO2019236790 A1   12/2019

OTHER PUBLICATIONS

The PCT Search Report and Written Opinion mailed Feb. 11, 2021 for PCT Application No. PCT/US20/57233, 10 pages.
(Continued)

*Primary Examiner* — Tyler W. Sullivan
(74) *Attorney, Agent, or Firm* — Lee & Hayes, P.C.

(57) ABSTRACT

Tracking a current and/or previous position, velocity, acceleration, and/or heading of an object using sensor data may comprise determining whether to associate a current object detection generated from recently received (e.g., current) sensor data with a previous object detection generated from formerly received sensor data. In other words, a track may identify that an object detected in former sensor data is the same object detected in current sensor data. However, multiple types of sensor data may be used to detect objects and some objects may not be detected by different sensor types or may be detected differently, which may confound attempts to track an object. An ML model may be trained to receive outputs associated with different sensor types and/or a track associated with an object, and determine a data structure comprising a region of interest, object classification, and/or a pose associated with the object.

19 Claims, 6 Drawing Sheets

(51) Int. Cl.
| | |
|---|---|
| *G01S 13/931* | (2020.01) |
| *G01S 17/89* | (2020.01) |
| *G01S 17/931* | (2020.01) |
| *G05D 1/00* | (2024.01) |
| *G06T 7/215* | (2017.01) |
| *G06T 7/246* | (2017.01) |
| *G06T 7/292* | (2017.01) |
| *G06V 10/25* | (2022.01) |
| *G06V 10/778* | (2022.01) |
| *G06V 10/80* | (2022.01) |
| *G06V 20/56* | (2022.01) |
| *G06V 30/19* | (2022.01) |
| *G06V 30/24* | (2022.01) |

(52) U.S. Cl.
CPC ............ *G01S 17/89* (2013.01); *G01S 17/931* (2020.01); *G05D 1/0248* (2013.01); *G06T 7/215* (2017.01); *G06T 7/251* (2017.01); *G06T 7/292* (2017.01); *G06V 10/25* (2022.01); *G06V 10/778* (2022.01); *G06V 10/80* (2022.01); *G06V 20/56* (2022.01); *G06V 30/19147* (2022.01); *G06V 30/19173* (2022.01); *G06V 30/1918* (2022.01); *G06V 30/2552* (2022.01); *G01S 2013/932* (2020.01); *G06T 2207/20081* (2013.01); *G06T 2207/20084* (2013.01); *G06T 2207/30241* (2013.01); *G06T 2207/30261* (2013.01)

(56) References Cited

U.S. PATENT DOCUMENTS

| | | | | |
|---|---|---|---|---|
| 10,482,584 | B1 * | 11/2019 | Kim | G06V 10/30 |
| 10,825,188 | B1 * | 11/2020 | Tan | G06T 7/11 |
| 2018/0053093 | A1 * | 2/2018 | Olabiyi | B60W 50/0097 |
| 2018/0350391 | A1 | 12/2018 | Moore et al. | |
| 2019/0026597 | A1 | 1/2019 | Zeng | |
| 2019/0103023 | A1 | 4/2019 | McNew et al. | |
| 2019/0113918 | A1 | 4/2019 | Englard et al. | |
| 2019/0147372 | A1 * | 5/2019 | Luo | G06N 20/00 706/20 |
| 2019/0174207 | A1 * | 6/2019 | Cella | H04L 67/12 |
| 2019/0180451 | A1 | 6/2019 | Kellner | |
| 2019/0266410 | A1 | 8/2019 | Seeber et al. | |
| 2019/0310651 | A1 | 10/2019 | Vallespi-Gonzalez et al. | |
| 2019/0317499 | A1 * | 10/2019 | Imai | B60W 50/0098 |
| 2019/0325223 | A1 | 10/2019 | Chen | |
| 2019/0333232 | A1 * | 10/2019 | Vallespi-Gonzalez | G06V 20/30 |
| 2019/0354782 | A1 | 11/2019 | Kee et al. | |
| 2019/0359208 | A1 | 11/2019 | Sapp et al. | |
| 2020/0082248 | A1 | 3/2020 | Villegas et al. | |
| 2020/0160532 | A1 * | 5/2020 | Urtasun | G06T 17/00 |
| 2020/0172098 | A1 * | 6/2020 | Abrahams | G06N 3/047 |
| 2020/0218913 | A1 | 7/2020 | Unnikrishnan et al. | |
| 2020/0239029 | A1 * | 7/2020 | Kim | B60W 60/0059 |
| 2020/0329386 | A1 * | 10/2020 | Perez-Ramirez | H04L 45/08 |
| 2021/0096566 | A1 * | 4/2021 | Wang | B60W 30/0953 |
| 2021/0101624 | A1 * | 4/2021 | Philbin | G06V 10/803 |
| 2021/0237761 | A1 * | 8/2021 | Das | G06T 7/20 |
| 2022/0227396 | A1 * | 7/2022 | Tsuchida | G01C 21/28 |

OTHER PUBLICATIONS

The PCT Search Report and Written Opinion mailed Mar. 19, 2021 for PCT application No. PCT/US21/15811, 10 pages.

Office Action for U.S. Appl. No. 16/866,865, mailed Jun. 23, 2022, Das, "Object Velocity and/or Yaw Rate Detection and Tracking", 29 pages.

The International Preliminary Report on Patentability for PCT Application No. PCT/US20/57233, mailed May 5, 2022.

Office Action for U.S. Appl. No. 16/866,865, mailed on Jan. 12, 2023, Das, "Object Velocity and/or Yaw Rate Detection and Tracking", 37 pages.

PCT Search Report and Written Opinion mailed Oct. 26, 2023 for PCT application No. PCT/US2020057233, 10 pages.

Extended European Search Report mailed Nov. 9, 2023 for European Application No. 21747601.9, a foreign counterpart to U.S. Pat. No. 11,663,726, 9 pages.

* cited by examiner

TOP-DOWN VIEW OBJECT DETECTION AND TRACKING

RELATED APPLICATION

This application claims the benefit of U.S. Provisional Application No. 62/926,423, filed Oct. 26, 2019, the entirety of which is incorporated herein.

BACKGROUND

Autonomous vehicle may use sensors to capture data regarding an environment through which the autonomous vehicle traverses. Autonomous vehicles use this sensor data to detect objects in the environment to avoid collisions. However, since autonomous vehicles may include two or more different types of sensors and the sensor data may accordingly widely vary in its format and content, the detections generated by two different sensor types may differ. Small discrepancies between the detections determined in association with two different sensor types may cause object representations created by the vehicle to jitter (i.e., "jump around") and/or flicker (i.e., appear and disappear). Some sensor types, such as depth cameras, may also be prone to large erroneous variations in depth measurements, which may further complicate tracking an object. This may impede the efficiency of navigating a vehicle safely and/or training machine-learning (ML) models. Moreover, techniques for reducing the discrepancies and/or smoothing the object representations or data related thereto may consume computing bandwidth and/or memory.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
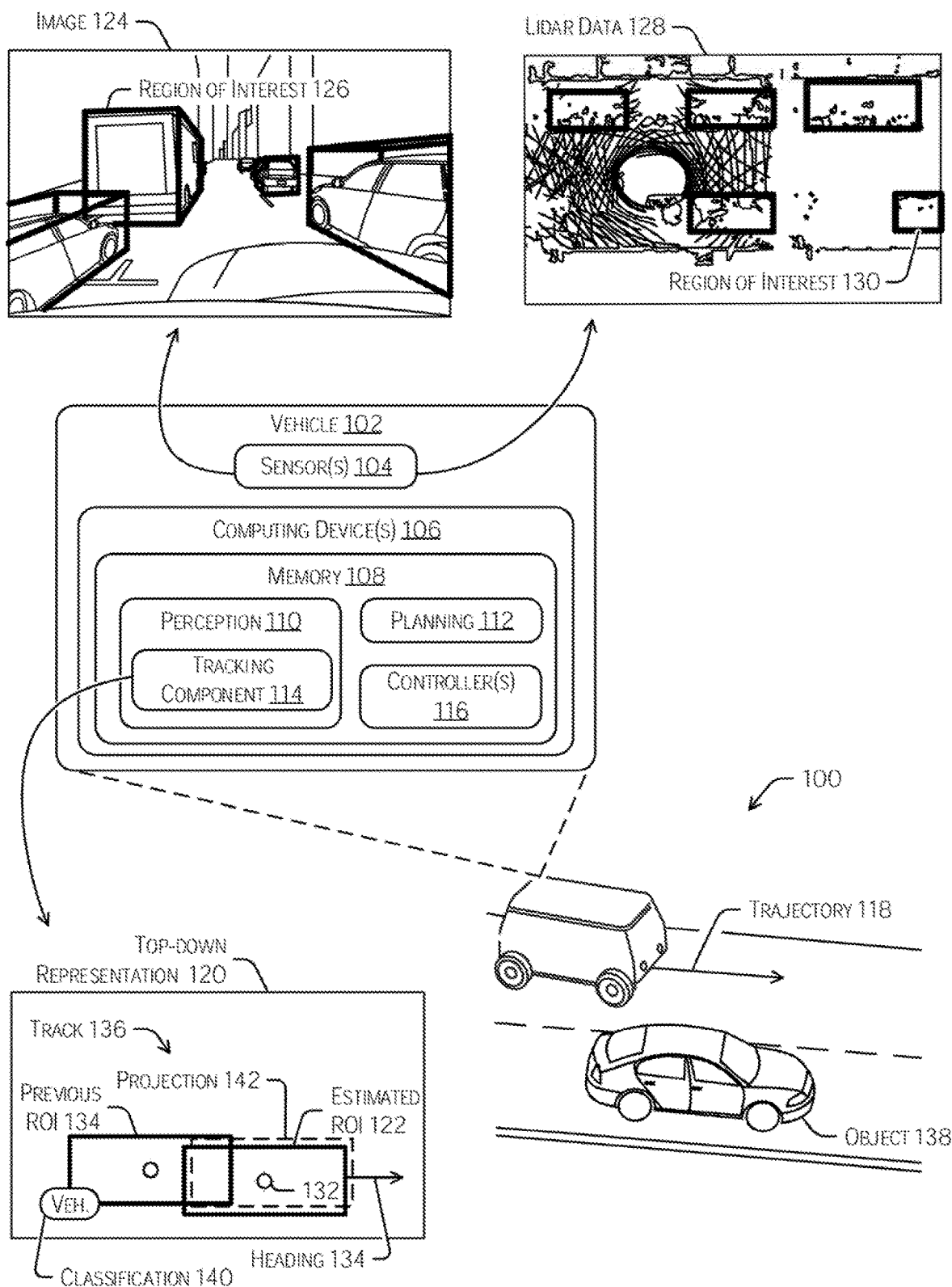
FIG. 1 illustrates an example scenario in which an autonomous vehicle configured with perception and tracking components may track an object's previous and current positions, velocities, and/or headings in an environment surround the autonomous vehicle and generate a trajectory for controlling the autonomous vehicle based at least in part on the track.

Techniques for tracking a current and/or previous position, velocity, acceleration, or heading of an object using sensor data may comprise determining whether to associate a current object detection generated from recently received (e.g., current) sensor data with a previous object detection generated from formerly received sensor data. In other words, a track may identify that an object detected in former sensor data is the same object detected in current sensor data. In some examples, the track may additionally or alternatively comprise various current and/or previous data about the object useful for a planning component of an autonomous vehicle to predict motion/behavior of the object and to determine a trajectory and/or path for controlling the autonomous vehicle. For example, the track may additionally or alternatively comprise an indication of region(s) of the environment currently and/or previously occupied by the object, an object classification associated with the object (e.g., a vehicle, an oversized vehicle, a pedestrian, a cyclist), a current/or previous heading associated with the object, a current and/or previous velocity and/or acceleration of the object, and/or a current position and/or velocity of the object, though any other parameter is contemplated.

In some examples, one or more sensors of a sensor type may be associated with a pipeline (e.g., a series of operations; steps; networks or layers thereof; machine learned models; hardware such as analog-to-digital converters, amplifiers, field-programmable gate array(s) (FPGA(s)), application-specific integrated circuit(s) (ASIC(s), and/or the like), etc.) used to determine information about objects contained in the associated sensor data) associated with that sensor type. Sensor data may be received from the one or more sensors of that type and the pipeline (which herein may be referred to as a perception pipeline) may generate a representation of the environment based at least in part on the sensor data. For simplicity, the collective outputs of a pipeline are referred to herein as an environment representation. An environment representation may comprise one or more object detections and may comprise one or more output types. For example, a vision pipeline 302 may output an environment representation 308 based at least in part on vision data 310 (e.g., sensor data comprising one or more RGB images, thermal images).

The environment representation may comprise an object detection, which may include an indication and/or a likelihood that a portion of the environment is occupied by an object, a region of interest (ROI) (e.g., a bounding box, a mask, a segmentation, or some other identification that a region of the environment is occupied by an object) associated with a detected object, an object classification of the object, a heading of the object, a velocity and/or acceleration of the object, a height of the object, and/or the like. The environment representation may additionally or alternatively comprise a voxelized representation of the sensor data (a discretized three-dimensional representation of such data) and/or top-down segmentation, as discussed in more detail in U.S. patent application Ser. No. 15/963,833, which is incorporated in its entirety herein, and/or a top-down representation of the environment. Note that U.S. patent application Ser. No. 15/963,833 may be modified to additionally or alternatively include the regressions discussed herein and may be modified by backpropagating a loss associated with these additional or alternate regressions. In some examples, the regions of interest discussed herein may be a three-dimensional ROI and/or a two-dimensional ROI (e.g., a top-down/bird's eye perspective of the ROI). In some examples, additional environment representation(s) may be generated by perception pipeline(s) associated with different sensor type(s).

In some examples, multiple object detections may be generated in association with a same object in the environment. These multiple object detections may be generated by different perception pipelines, which may be associated with different sensor types. For example, a lidar perception pipeline may receive lidar data and determine an object detection associated with an object, a hybrid lidar-vision perception pipeline may receive lidar and vision data and generate a different object detection associated with the same object, a vision perception pipeline may receive image(s) from a camera and generate an additional object detection associated the same object, and so on. Due to differences between the sensors and perception pipelines, object detections associated with a same object generated by different pipelines may vary between each other. For example, a first object detection may indicate an ROI associated with an object that has different dimensions that an ROI indicated by a second object detection associated with a same object. In a more drastic case, one pipeline may generate an object detection associated with an object and another pipeline may not generate a detection at all. For example, a radar or lidar pipeline may detect an object but the object may be occluded from a camera's field of view.

In some examples, the techniques discussed herein may comprise aggregating at least a portion of environment representations associated with different sensor types and providing the aggregated data as input to an ML model trained to output an estimated object detection. In some examples, the aggregated data may be represented in a multi-channel image, where different channels may be associated with different sensor types from which the perception data was generated and/or different types of perception data. For example, the aggregated data may comprise a lidar, vision, and/or radar occupancy grid (e.g., a grid having a discrete portion, such as a pixel, that indicates whether a corresponding location in the environment is occupied or unoccupied according to the perception pipeline associated with the respective sensor data type); a top-down representation of an ROI generated in association with lidar, vision, and/or radar; an object classification associated with a portion of the environment; a probability that a portion of the environment is occupied; a yaw of a detected object; and/or the like. See U.S. patent application Ser. No. 16/591,518 regarding occupancy maps, the entirety of which is incorporated herein by reference. In some examples, the occupancy grid may extend to a maximum height, which may correspond to a height of the autonomous vehicle plus a buffer. In other words, the occupancy grid may indicate the occupancy of a portion of the environment below a maximum height. For example, an occupancy grid would not indicate a portion of the environment as being occupied due to a traffic light or signage positioned over a street because such objects may be located above the maximum height.

In some examples, the aggregated data may additionally or alternatively comprise data from a remote computing device and/or non-perception-based data such as, for example, map data (e.g., roadway data, drivable surface locations, destinations), weather data, traffic notifications (e.g., congestion, collision, lane modification, construction, speed modification), safety notifications (e.g., environmental hazard location, disaster location, road surface condition, visibility condition), and/or the like. In some examples, the remote computing device may be another autonomous vehicle, a third party service, distributed computing device(s), remote sensor(s), and/or the like.

In some examples, the data aggregated from the different pipelines may additionally comprise at least a portion of an environment representation for one or more previous times. For example, the perception pipelines associated with the different sensor types may be synchronized to generate environmental representations at a same frequency (e.g., every 100 milliseconds, every 500 milliseconds, every second). In an example where the perception pipelines are synchronized to output environmental representations at substantially the same time every 500 milliseconds, the aggregated data may comprise the data discussed above for 0 milliseconds (i.e., a set of aggregated data corresponding to a most recently received set of environmental representations), −500 milliseconds, 1 second, and so on. In at least one example, the aggregated data may comprise a multi-channel image comprising aggregated data for the time steps 0 milliseconds, −100 milliseconds, −200 milliseconds, −300 milliseconds, and/or −400 milliseconds, and/or −1 second, −2 seconds, and/or −3 seconds, although any suitable time steps may be used. For example, the aggregated data may comprise object detections received from the different pipelines for the current and last n time steps where n is a positive integer (e.g., 1, 2, 3, 4, 5, 10, and/or the like).

In some examples, one or more previously generated tracks may be provided as input to the ML model in addition to the aggregated data (e.g., as a channel of the aggregated data). For example, a track may be generated in associated with every time step or at an interval (e.g., every other time step). The previously generated tracks may be included as a channel in the multi-channel image. In some examples, the track may comprise a center, extents, and/or yaw of an ROI associated with an object and/or an identifier associated the ROI with other former regions of interests generated in association with the object.

In some examples, the ML model may be trained to output a final environment representation, which may comprise one or more estimated object detection(s). As discussed above, the object detections associated with an object may vary in dimension, location, or even existence between the different pipelines. The final environment representation may comprise a single estimated object detection per object that is determined based at least in part on the object detection(s) received from the different pipelines (e.g., received as input to the ML model as part of the aggregated data). For example, the estimated object detection generated by the ML model may comprise an ROI identifying a portion of the environment as being occupied (e.g., a region associated with the object), a predicted ROI associated with a future time, a velocity associated with the ROI, an object classification associated with the ROI (e.g., vehicle, pedestrian, large vehicle, cyclist), a classification of the velocity of the ROI (e.g., stationary or dynamic), a heading (e.g., yaw) associated with the ROI, and/or a heading bin (e.g., two bins centered at 0 degrees and 180 degrees; four bins centered at 0 degrees, 90 degrees, 180 degrees, and 270 degrees; this output may further comprise a distance from the bin center), and/or a height associated with the ROI (e.g., a height of the detected object). In some examples, any regions of interest may be generated based at least in part on output of a confidence layer, such as according to a non-maximum suppression technique. For example, see U.S. patent application Ser. Nos. 16/013,764 and 16/013,729, which are incorporated herein in their entirety.

In some examples, the output of the ML model may comprise an image where each pixel stores the above-mentioned information. For example, the final environment representation may comprise a top-down representation of the environment, such as an image. The image may indicate the data discussed above. A pixel of the image may indicate that a portion of the environment is occupied, an object classification of the object occupying the portion, a velocity of the object, and so on. An object detection may be indicated in the final environment as a region of pixels (or other discrete portions of the final environment) that are indicated as being occupied and/or being associated with the data discussed above (e.g., object classification, object velocity, object heading).

In some examples, the techniques may further comprise determining whether to associate a previously generated track with one of the estimated object detections of the final environment representation and/or generate a new track. In some examples, the techniques may comprise receiving a previous track and projecting an ROI associated with the previous track from a previous time frame associated with the previous track to a current and/or future time frames. For example, this may comprise altering a representation of a position and/or heading of the ROI. In an additional or alternate example, the projected ROI may comprise a predicted ROI output by the ML model at a previous time step. The techniques may comprise determining a degree of association of the projected ROI with any of the estimated object detections generated by the ML model. For example, the degree of association may comprise determining a degree of overlap (e.g., an intersection over union (IOU)), Munkres match score, a size comparison, a feature comparison (E.g., is the projected ROI associated with a same object classification as the estimated object detection? Is there a large disparity between the velocity associated with the projected ROI and the velocity predicted in association with the estimated object detection?), and/or the like. In some examples, determining the degree of association may be encoded in a scoring function, which may be machine-learned and/or deterministic. For example, the IOU may be deterministically determined and used as an input along with a representation of a position and size of the projected ROI relative to the estimated object detection ROI to an ML model that determines a score for the degree of association.

If the degree of association meets or exceeds a threshold, the techniques may comprise associating the previous track with the estimated object detection. However, if the degree of association does not meet the threshold, the techniques may comprise testing the estimated object detection with any other projected ROIs (e.g., other ROIs that overlap the estimated object detection or are within a threshold distance) and/or generating a new track in association with the estimated object detection if no projected ROI matches the estimated object detection. In an additional or alternate example, a previous track may be associated with an estimated object detection or a new track may be generated more simply based on just IOU, although additional or alternate data may be used to determine when the estimated object detection corresponds with a previous object detection/track.

The techniques discussed herein may improve the safety of a vehicle by improving the vehicle's ability to predict movement and/or behavior of objects in the vehicle's surroundings and/or continue to account for objects that may be temporarily occluded. The techniques may also increase the operating range of the perception system (e.g., increased to 40 meters, 60 meters, or 80 meters from the vehicle). In at least some examples, the techniques may further reduce the computing bandwidth for determining a track associated with an object, particularly in instances where different sensor modalities generate different sized regions of interest, when a depth estimate associated with a sensor modality changes, when an object is over-segmented and/or under-segmented. Other techniques using multiple sensor modalities to track objects may require comparing the object detection from each sensor modality to the previous track, whereas the instant techniques comprise comparing the estimated object detection determined by the ML model with the previous track. The techniques may increase the accuracy of object detection (e.g., object location, segmentation) and/or tracking. Tracks generated using the techniques discussed herein jitter less since the underlying object detections are more stable.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or amore remote computing devices via wired and/or wireless networks.

Computing device(s) 106 may comprise a memory 108 storing a perception component 110, a planning component 112, tracking component 114, and/or system controller(s) 116. Although depicted in FIG. 1 for illustrative purposes, it should be understood that the tracking component 114 may reside in/on a separate computing device (or otherwise) than any one or more of the other components. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. The perception component 110, the planning component 112, and/or the tracking component 114 may include one or more machine-learned (ML) models and/or other computer-executable instructions.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

In some examples, the perception component 110 may receive sensor data from the sensor(s) 104 and determine data related to objects in the vicinity of the vehicle 102 (e.g., object classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., the environment representations, object detections, and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise LIDAR and/or radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112. In some examples, perception data may comprise outputs of sensor specific pipelines (e.g., vision, lidar, radar) and/or hybrid sensor pipelines (e.g. vision-lidar, radar-lidar). The perception data may additionally or alternatively comprise a track, estimated object detection, and/or final environment representation, as discussed herein.

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

The tracking component 114 may receive one or more environment representations and/or object detections from respective perception pipelines (e.g., vision pipeline, lidar pipeline, hybrid vision-lidar pipeline, radar pipeline, hybrid vision-lidar-radar pipeline, and/or the like) and determine whether or not to associate a formerly generated track with a current object detection or to generate a new track in association with a current object detection. The tracking component 114 may additionally or alternatively determine a final environment representation and/or an estimated object detection that may act as a summary of the different object detections. In some examples, the tracking component 114 discussed herein may determine an estimated object detection by inputting object detections and/or environment representations generated by one or more sensor types (e.g., discrete sensor types such as lidar, RGB camera, thermal image, sonar, radar; and/or hybrid sensor types such as vision-lidar association, lidar-radar association) into the ML model discussed herein that is trained to output a final environment representation that may comprise an estimated object detection. In some examples, if a degree of association (e.g., an intersection over union (IOU), a score based at least in part on a size and/or feature comparison) of the estimated object detection to a projection of the previous track meets or exceeds a threshold, the estimated object detection may be associated with the previous track, instead of basing the determination on the raw object detections. If the IOU is less than the threshold, the raw object detection may be included in the determination.

For example, FIG. 1 illustrates a top-down representation 120 of the environment that may be part of a final environment representation determined by an ML model of the tracking component 114. The top-down representation 120 indicates an object detection in this case, illustrated as the estimated ROI 122. The top down representation 120 and/or estimated ROI 122 may have been determined by an ML model of the tracking component 114 based at least in part on object detection(s) received from one or more perception pipelines. For example, the object detections provided as input to the ML model may have comprised three-dimensional ROIs associated with image 124, one of which is indicated as ROI 126, and top-down ROIs associated with lidar data 128 (e.g., which may be two and/or three-dimensional), of which ROI 130 is indicated.

Estimated ROI 122 may be part of an estimated object detection generated by the ML model in association with an object identified by at least one of the perception pipelines. Estimated ROI 122 is depicted as comprising a center 132 and extents (black lines). The extents may be defined based at least in part on an anchor box associated with an object classification that was determined by the ML model in association with the estimated object detection. In additional or alternate examples, the estimated ROI may comprise any other identification of a portion of the top-down representation, such as another form of bounding shape or a mask.

FIG. 1 also illustrates a previous ROI 134 associated with a track 136 that was previously generated by the tracking component 114 in association with one or more object detections. In some examples, the track 136 may associate one or more previous object detections and/or may indicate data related thereto, such as a velocity, acceleration, heading, object classification, unique identifier, occlusion status (e.g., whether the object is currently/previously occluded partially or totally from one or more sensors). The previous ROI 134 may be associated with any of the data discussed herein as being associated therewith (e.g., occupation map, top-down segmentation, object classification, object heading, object velocity and/or acceleration). For example, previous ROI 134 may be associated with object 138 and the object classification 140 "vehicle." For the sake of example previous ROI 134 may be associated with a most recent object detection associated with the track 136.

The techniques discussed herein may comprise projecting the previous ROI 134 into a time associated with the estimated ROI 122, which may comprise predicting a location, orientation, velocity, acceleration, and/or the like of the object associated with the previous ROI 134 based on the track 136 and data associated therewith. FIG. 1 depicts such a projection 142 of the previous ROI 134 in dashed lines. In the depicted example, the IOU between the estimated ROI 122 meets or exceeds the degree of association threshold since the estimated ROI 122 is also associated with a vehicle and/or the IOU between the projection 142 and the estimated ROI 122 meets or exceeds an IOU threshold.

Regardless, a track may comprise at least a previous ROI, which may comprise a center, extents, etc. and the estimated object detection may comprise an estimated ROI 122. In some examples, the technique discussed herein may comprise projecting a previous ROI based at least in part on a velocity and/or heading associated with the track. If an IOU, distance between centers, distance between embeddings, or Munkres match of the projected ROI 142 to the estimated ROI 130 satisfies a threshold, the estimated object detection may be added to the track 136. If not, the estimated object detection may be associated with a new track and/or an alternate tracking component may use the raw detections to generate a track.

Example System

Figure 2:
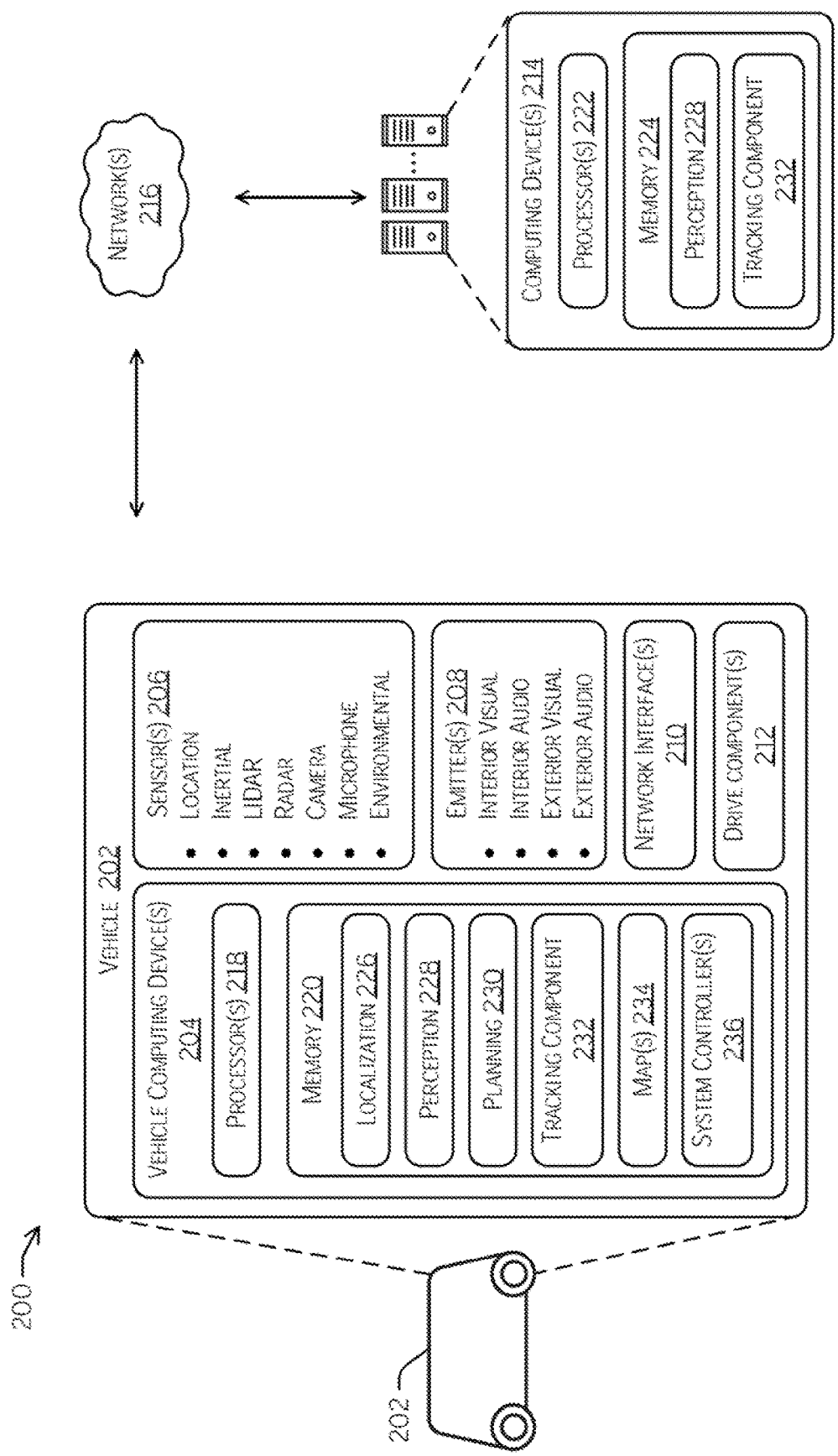
FIG. 2 illustrates a block diagram of an example system comprising a perception component and tracking component.

FIG. 2 illustrates a block diagram of an example system 200 that implements the techniques discussed herein. In some instances, the example system 200 may include a vehicle 202, which may represent the vehicle 102 in FIG. 1.

In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth® (UHF radio in the ISM bands), cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, tracking component 232, map(s) 234, and/or system controller(s) 236. Perception component 228 may represent perception component 110, planning component 230 may represent planning component 112, and/or tracking component 232 may represent tracking component 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 234 of an environment and can continuously determine a location, velocity, and/or orientation of the autonomous vehicle within the map(s) 234. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the tracking component 232, a location and/or orientation of the vehicle 202 relative to the environment and/or sensor data associated therewith.

In some instances, perception component 228 may comprise a primary perception system and/or a prediction system implemented in hardware and/or software. The perception component 228 may comprise one or more perception pipelines that may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 236 and/or drive component(s) 212 may parse/cause to be carried out, second instructions for the emitter(s) 208 may be formatted according to a second format associated therewith).

The tracking component 232 may operate on the vehicle 202 and/or on the computing device(s) 214. In some examples, the tracking component 232 may be upstream (provide input to) from the planning component 230 in a pipeline and downstream (receive input) from at least some components of the perception component 228. The tracking component 232 may be configured to pass all, part, or none of the output of the tracking component 232 to the planning component 230. In some examples, the tracking component 232 may be part of the perception component 228. In some examples, the tracking component 232 may comprise the ML model discussed herein that determines a final environment representation, which may comprise an estimated object detection. The tracking component 232 may additionally or alternatively comprise a first component that receives an estimated object detection generated by the ML model and at least one "raw" object detection generated in association with a sensor type (e.g., one of the inputs to the ML model) and/or a second component that receives estimated object detection and one or more object detections associated with a track. At any rate, first component and/or the second component of the tracking component may determine whether or not to associate an estimated object detection with a track or to generate a new track in association with an object detection. The tracking component 232 may additionally or alternatively output a velocity, heading, and/or other historic or current characteristics of one or more object detections, all or part of which may be at least part of a track.

The memory 220 and/or 224 may additionally or alternatively store a mapping system (e.g., generating a map based at least in part on sensor data), a planning system, a ride management system, etc. Although localization component 226, perception component 228, planning component 230, tracking component 232, map(s) 234, and/or system controller(s) 236 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, the planning component 230, the tracking component 232, and/or other components of the system 200 may comprise one or more ML models. For example, the localization component 226, the perception component 228, the planning component 230, and/or the tracking component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 236, which may be configured to control steering, propulsion, braking, safety, emitters, communication, and other systems of the vehicle 202. These system controller(s) 236 may communicate with and/or control corresponding systems of the drive component(s) 212 and/or other components of the vehicle 202. For example, the planning component 230 may generate instructions based at least in part on perception data generated by the perception component 228, and may validate and the perception data/or transmit the instructions to the system controller(s) 236. The system controller(s) 236 may control operation of the vehicle 202 based at least in part on the instructions received from the planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example System

Figure 3:
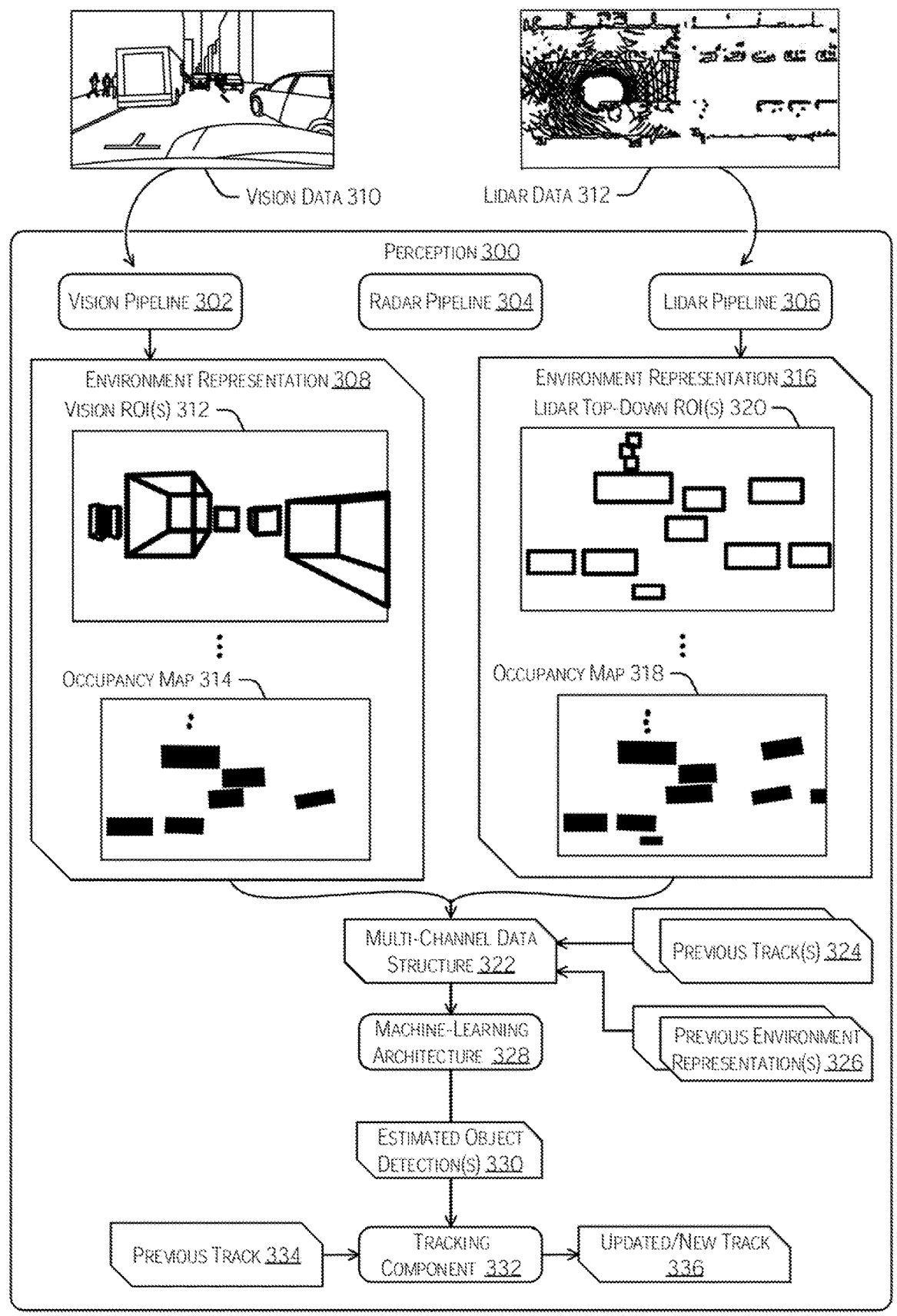
FIG. 3 illustrates a block diagram of at least part of a perception architecture that includes components for accomplishing the improved object tracking techniques discussed herein.

FIG. 3 illustrates a block diagram of an example perception system 300 for determining an estimated object detection from one or more object detections received from disparate perception pipelines and/or determining an updated or new track based at least in part on the estimated object detection. Example perception system 300 may comprise any number of pipelines for determining characteristics of the surroundings of the perception system 300. For example, the pipeline(s) may determine what is in an environment of an autonomous vehicle and/or the sensor(s) and/or characteristics of objects in the environment. FIG. 3 depicts three pipelines: a vision pipeline 302, a radar pipeline 304, and a lidar pipeline 306, although any number and types of pipeline(s) are contemplated. For example, a pipeline may be associated with a same type of sensor (e.g., one or more cameras, one or more lidar sensors, one or more radar sensors), a direction of field of view (e.g., one or more cameras having an overlapping field of view), multiple types of sensors (e.g., a hybrid vision-lidar pipeline), data from other sources (e.g., data from a remote computing device, map data stored in memory), and/or the like.

Regardless, a pipeline of the one or more pipelines may be configured to receive sensor data and determine one or more outputs. For simplicity, the collective outputs of a pipeline are referred to herein as an environment representation. An environment representation may comprise one or more object detections and may comprise one or more output types. For example, a vision pipeline 302 may output an environment representation 308 based at least in part on vision data 310 (e.g., sensor data comprising one or more RGB images, thermal images). The environment representation 308 generated by the vision pipeline 302 may comprise one or more object detections, wherein at least one of the object detections comprises:

a two-dimensional ROI associated with an object;
a three-dimensional ROI associated with the object, such as one of those depicted at 312 as described in more detail in U.S. patent application Ser. No(s). 15/970,838 and 16/386,249, the entirety of which are incorporated herein by reference;
a depth estimate (e.g. an estimate of the distance from a sensor/vehicle to the object) associated with the object and/or ROI as discussed in U.S. patent application Ser. No. 15/970,838;
a height of the object as discussed in U.S. patent application Ser. No. 15/970,838;
an object classification and/or likelihood associated with the object, the likelihood indicating a posterior probability that the sensor data is associated with object of the type specified by the object classification (e.g., vehicle, pedestrian, articulated vehicle, animal, child)—in some examples, the object classification and/or likelihood may be associated with a discrete portion of sensor data such as a pixel;
a vision embedding;
a position (e.g., a center and/or extents) of the object relative to a representation of the environment (e.g., a voxelization of the environment, a mesh representation of the environment);
a pose of the object, which may comprise the position and/or heading of the object;
an occupancy map 314 (e.g., whether there is an object occupying a pixel/voxel, an instance segmentation), which may comprise a portion indicated as being occupied by the object; and/or
an occlusion grid (e.g., comprising a probability that a portion of the environment is occluded from a line of sight to one or more of the vision sensors).

A radar pipeline 304 may determine an environment representation (unillustrated to conserve drawing space) comprising:

an occupancy map, which may comprise a portion indicated as being occupied by the object;
an occlusion grid (e.g., comprising a probability that a portion of the environment is occluded from a line of sight to one or more of the radar sensors), as discussed in more detail in U.S. patent application Ser. No. 16/407,139, the entirety of which is incorporated herein by reference;
a yaw rate associated with an object, as discussed in more detail in U.S. patent application Ser. No. 16/416,686, the entirety of which is incorporated herein by reference;
a velocity associated with an object (e.g., a ground-based range rate associated with an object);
radar cross section (RCS); and/or
a ROI and/or object classification.

A lidar pipeline 306 may determine an environment representation 316 comprising:

an occupancy map 318, which may comprise a portion indicated as being occupied by the object;
an occlusion grid (e.g., comprising a probability that a portion of the environment is occluded from a line of sight to one or more of the lidar sensors);
an ROI and/or object classification associated with an object; and/or
a top-down segmentation (e.g., a top-down indication of whether a portion of the environment is occupied and/or top-down ROI (e.g., such as the lidar top-down ROI(s) depicted at 320), as discussed in more detail in U.S. patent application Ser. No. 15/963,833, which is incorporated in its entirety herein.

The pipelines illustrated and discussed regarding FIG. 3 are merely examples. The perception system 300 may comprise more, less, and/or different pipelines than those illustrated and discussed herein. Moreover, the pipelines may be intermixed instead of being neatly separate as depicted. For example, at least some of the environment representations discussed above may be a product of part of two different pipelines. Note that in the depicted example, due to the limited space and the enlargement of the vision environment representation and the lidar environment representation for the clarity thereof, particular details regarding a radar environment representation are not depicted, although a radar pipeline and radar environment representation are additionally or alternatively contemplated.

The various environment representations produced by the different pipelines may be aggregated into a multi-channel data structure 324. For example, this aggregating may comprise projecting the data into a common representation of the environment, such as a voxel space, a mesh representation, or the like in a common reference frame and/or having same dimensions. The aggregating may additionally or alternatively comprise determining a top-down representation of one or more parts of an environment representation, such as projecting a three-dimensional ROI into a two-dimensional ROI from a top-down perspective and/or determining a top-down two-dimensional ROI based at least in part on a two-dimensional ROI associated with a sensor-perspective, a depth, and/or an object classification. In some examples, the multi-channel data structure 324 may comprise a multi-channel image, where each channel of the image may be associated with a different pipeline and/or a different type of output (e.g., occupancy map, occlusion grid, ROI, object classification). For example, a first channel of the image may comprise pixels indicating whether respective portions of the environment are occupied/unoccupied as determined by a vision pipeline, a second channel of the image may comprise pixels indicating whether respective portions of the environment are occupied/unoccupied as determined by a lidar pipeline, a third channel may comprise pixels indicating whether respective portions of the environment are associated with a certain object classification, and so on.

The multi-channel data structure 324 may comprise an output of one or more perception pipelines and/or data received from other sources (e.g., from a memory of an autonomous vehicle, from a remote computing device). For example, the multi-channel data structure 324 may comprise an environment representation that may comprise a top-down representation of an environment (e.g., which may be two, three-, or higher-dimensional), an occupancy map of the environment, a representation of an occluded portion of the environment, an ROI associated with an object, an object classification associated with the object, a sensor data segmentation, a three-dimensional discretized representation of sensor data, a yaw and/or yaw rate associated with the object, a velocity and/or acceleration associated with the object, a set of extents (e.g., dimensions) associated with the object, and/or a ground height estimation, as discussed in more detail in U.S. patent application Ser. No. 16/698,055, filed Nov. 27, 2019, which is incorporated herein in its entirety.

As used herein an object detection may be a portion of one or more environment representations that indicate the existence of an object, such as an ROI, a positive occupancy indication, an object classification, etc.

In some examples, previous track(s) 326 and/or previous environment representation(s) 328 may be part of the multi-channel data structure 324 or otherwise provided as input to the ML architecture 330. For example, the previous track(s) 326 and/or previous environment representation(s) 328 may be associated with a last n (where n is a positive integer) time steps at which environment representations were generated by the pipeline(s) and/or tracks were determined. For example, the system may be synchronized to determine environment representations and/or tracks at or by a time interval (e.g., every 10 milliseconds, every 100 milliseconds, every 500 milliseconds). The track(s) and/or environment representation(s) that were determined at the previous n number of time steps. In an additional or alternate example, for example where the perception system is semi-synchronized or un-synchronized, the previous track(s) 326 and/or previous environment representation(s) 328 may be associated with a time window. For example, this data may be accumulated, on a rolling basis, over a 2 second period, a 3 second period, 5 second period, and/or any other time window suitable for the application.

The multi-channel data structure 324 may be provided as input to the ML architecture 330, which may be trained to determine a final environment representation comprising one or more estimated object detection(s) 332. For example, the ML architecture 330 may determine a top-down representation of the environment comprising an indication that a portion of the environment is occupied, an ROI and/or object classification associated with the occupied portion (e.g., an object), an orientation of the object (e.g., yaw and/or yaw/heading bin), a velocity associated with the object (e.g., stationary/moving, a lateral and/or longitudinal velocity), a height associated with the object, and/or a predicted ROI associated with a future time step.

The final environment representation and/or the estimated object detection(s) 332 thereof may be provided as input to a tracking component 334. Tracking component 334 may be trained and/or configured to determine whether to associate an estimated object detection with a previous track 336, a new track, or to forward one or more object detections from the pipeline(s) and/or an estimated object detection 332 to a contingent tracking component. In some examples, the tracking component 334 may output an updated or new track 338 to a planning component based at least in part on the determination discussed herein.

In some examples, the contingent tracking component may be a tracking component configured to receive the raw environment representations from the pipeline(s) and determine a track therefrom. The contingent tracking component may, in some cases, require more compute and/or memory since the contingent tracking component uses more data between the different pipelines to determine whether an object detection is a false positive and/or whether to associate an object detection with a former track or a new track.

EXAMPLE PROCESS

Figure 4:
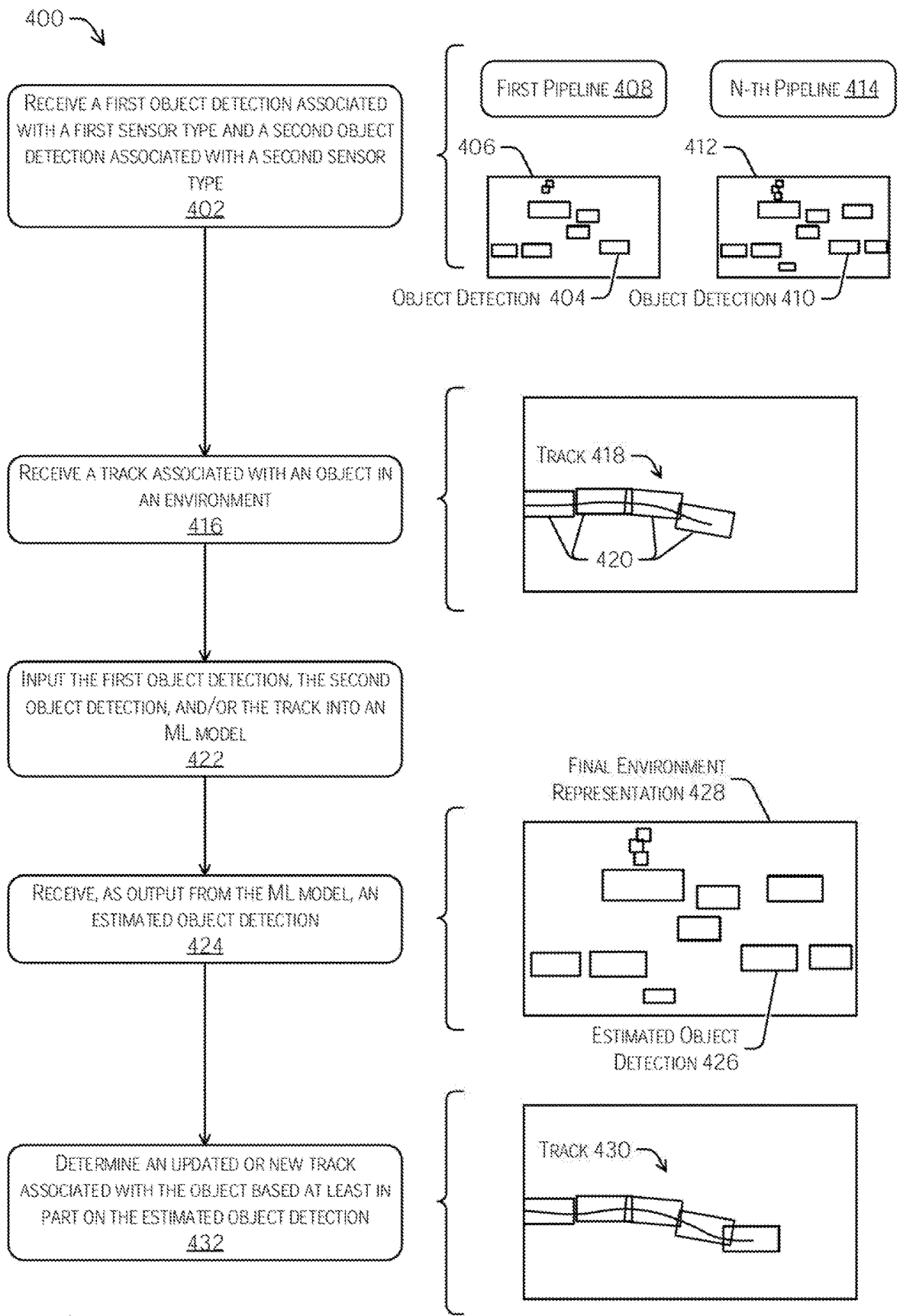
FIG. 4 illustrates a pictorial flow diagram of an example process for determining an estimated object detection based at least in part on perception pipeline object environment representation(s)/object detection(s), which may be generated based at least in part on sensor data.

FIG. 4 illustrates a pictorial flow diagram of an example process 400 for determining a final environment representation and/or an estimated object detection from multiple object detections and/or environment representations generated by one or more perception pipelines. Example process 400 may additionally or alternatively track objects in an environment based at least in part on determining to associate an estimated object detection with a previous track, determining to generate a new track to associated with the estimated object detection, and/or determining to forward the data discussed herein to a contingent tracking component.

At operation 402, example process 400 may comprise receiving a first object detection associated with a first sensor type and a second object detection associated with a second sensor type, according to any of the techniques discussed herein. For example, the first object detection 404 may be part of a first environment representation 406 received from a first pipeline 408 and the second object detection 410 may be part of an n-th object environment representation 412 received from an n-th pipeline 414.

Although the illustration depicts the object detections and environment representations as being top-down ROIs, in at least one example, the object detection(s) may comprise a lidar-based object detection, a radar-based object detection, and/or a vision-based object detection. The lidar-based object detection may comprise a lidar occupancy map, a lidar-based two or three-dimensional ROI, a top-down segmentation ROI, a top-down segmentation map, a lidar occlusion grid, and/or an object classification. The radar-based object detection may comprise a radar occupancy map, a ground-based range rate, RCS, radar-based ROI and/or object classification, and/or radar occlusion grid. The vision-based object detection may comprise a vision occlusion grid, instance segmentation, a two-dimensional ROI (e.g., in an image space), a three-dimensional ROI, a depth, an object classification, a vision embedding, and/or a pose (e.g., position and/or orientation) of the object. Additional or alternate object detections may be used. In some examples, some of the object detection components discussed above may comprise hybrid components such as, for example the radar-based ROI, pose data, or three-dimensional ROI, any of which may be lidar, radar, and/or vision based.

At operation 416, example process 400 may comprise receiving a track associated with an object in an environment, according to any of the techniques discussed herein. For example, the track 418 may be a track that was previously determined in association with a previous time step. In the depicted example the track 418 is associated with an object that has been detected by the first pipeline 408 and the n-th pipeline 414, as indicated by object detection 404 and object detection 410. The track 418 may associate any of the object detection data from the different pipelines and/or may comprise estimated object detection(s) generated by the ML model from previous time steps, at least as far back in time as a time window that is statically set or is set by a velocity of the vehicle, a number of objects being tracked (e.g., the more objects, the smaller the time window to conserve data, or the more objects the same or large the time window in order to track objects through occlusions), or a combination thereof. A track ultimately indicates that two different object detections generated by two different pipelines are associated with a same object and/or that the two different object detections in time generated by a same or different pipeline are associated with the same object.

The depicted track 418 associates previous estimated object detections generated by the ML model, which in the depicted example comprises four two-dimensional (top-down) ROIs (420) associated with a same vehicle in an environment surrounding the autonomous vehicle, a pose of the vehicle, and a historical position of a center of the vehicle, illustrated as a line through the ROIs. The estimated object detections may additionally or alternatively comprise an object classification, such as "vehicle" in this case, historical and/or (formerly) predicted velocities of the vehicle; a per-pixel occupancy (e.g., a mask of pixels associated with the vehicle); an estimated height of the vehicle; and/or the like.

At operation 422, example process 400 may comprise inputting the first object detection, the second object detection, and/or the track into an ML model, according to any of the techniques discussed herein. In some examples, the object detection(s) and/or track may be aggregated into a multi-channel data structure. In some examples, parts of some of the object detection(s) may be projected into a voxel space and/or rendered in a two-dimensional top-down view before operation 422.

Note that the object detections may be provided to the ML model as part of an environment representation. For example, environment representation 406 comprises multiple object detections and unillustrated data, such as object velocities, estimated heights, and more, as discussed above. In some examples, the environment representations may be aggregated and provided to the ML model as input. In some examples, an object detection may be isolated from the rest of the environment representation and provided as input. For example, the environment representations may be in a common reference frame or may be converted to a common reference frame during the aggregation. The pipeline(s) may be configured to output positive object detections along with their coordinates in the common reference frame. For example, these positive object detections may be portions of the environment representation associated with a likelihood that meets or exceeds a threshold confidence. Each and any of the object detection components discussed above may be associated with a regressed confidence score. For example, an object classification may be associated with a confidence score, an ROI may be determined based at least in part on confidence scores associated with different pixels via a non-maximum suppression technique, occupancy may be determined based at least in part on a likelihood associated with each pixel and determined by an ML model of a respective pipeline, and so on.

At operation 424, example process 400 may comprise receiving, as output from the ML model, an estimated object detection 426, according to any of the techniques discussed herein. In some examples, the ML model may be trained to output a final environment representation 428 and/or an estimated object detection 426. The estimated object detection 426 may be a part of the final environment representation 428 by nature of the final environment representation 428 indicating that a portion of the environment is occupied and/or associated with an object classification. The ML model may be trained to output an ROI (e.g., a center and/or extents) associated with an object, an object classification associated with the object, an estimated pose (e.g., position and/or orientation) of the object, an estimated velocity of the object, and/or an estimated height of the object. The ML model may additionally or alternatively determine a confidence score in association with any of these outputs. In some examples, the ROI may be generated based at least in part on an anchor box or any other canonic object shape associated with the object classification upon which the ML model has been trained.

In some examples, the final environment representation may comprise a multi-channel image of a top-down representation of the environment. The multi-channel image may comprise a discrete portion, such as a pixel, that indicates, in different channels, a distance to a center of a nearest ROI, an extent of the ROI, a likelihood that the pixel is associated with the object (e.g., used for non-maximum suppression for generating the ROI), a likelihood that the pixel is associated with a particular object classification of a plurality of object classifications, an orientation, a velocity, and/or an estimated height.

In some examples, the ML model may determine a class associated with the orientation that indicates a bin into which the orientation falls (e.g., North, South, East, West; any other number and types of heading bins, such as 45° bins, 90° bins, 180° bins, or the like) and/or a regression associated with the orientation (e.g., a number of degrees of variation from a center of the bin that was determined in association with the pixel).

In some examples, the ML model may determine the velocity using a classification algorithm, resulting in an output such as static or dynamic, or a bin of the velocity (e.g., increments of 5, 10, 15, or such miles per hour such that a bin may indicate that the object is moving at 1-10 miles per hour in at least one example). Additionally or alternatively, the ML model may determine the velocity using a regression task, either as an offset from a center of the velocity bin (e.g., where the velocity value may be determined by adding/subtracting the regression from a value of a bin in which the object was classified) or as a stand-alone regression (e.g., the regression task computes the velocity directly). In some examples, the velocity binning and/or regression task may be based at least in part on one or more previous object detections and/or tracks that are part of the input multi-channel image. Similarly, the ML model may determine the estimated height using a classification task (e.g., as a height bin) and/or a regression task (e.g., as an offset from the height bin or a directly regressed height).

In some examples, training the ML model may comprise determining a classification loss based at least in part on a difference between an object classification, an orientation bin, a velocity bin, and/or an estimated height bin and respective ground truth (e.g., a semantic label, ground truth instance segmentation and/or ground truth ROI for the object classification; a ground truth orientation indication for the orientation bin; a ground truth velocity for the velocity bin; a ground truth height for the height bin). In some examples, a total classification loss may be determined by summing these losses. In some examples, determining the classification loss may comprise determining a cross-entropy focal loss, as discussed in more detail in U.S. patent application Ser. No. 16/013,729 the entirety of which is incorporated herein by reference, although other forms of loss are contemplated. In some examples, determining the classification loss for the bins may be based at least in part on a cross entropy or Huber loss.

Training the ML model may additionally or alternatively comprise determining one or more regression losses based at least in part on a difference between a distance to a center of an ROI; an extent of an ROI, which may be indicated in a logarithmic space; an estimated orientation or offset from an orientation bin; an estimated velocity or offset from a velocity bin; and/or an estimated height or offset from a height bin and respective ground truth associated therewith respectively. Determining the regression loss may comprise determining an L1 (or any other loss) loss for each of one or more of the regression outputs discussed above and summing those regression losses to determine a total regression loss.

Training the ML model may additionally or alternatively comprise determining a total loss by summing the total classification loss and the total regression loss. In some examples, the ML model may be trained to output uncertainties in association with each task. The loss determined for a task may be weighted based at least in part on the uncertainty output in association with the output task, such that the greater the uncertainty, the greater the weight applied to the loss, and the greater the resultant loss. This weighting may occur before determining the total classification loss and/or total regression loss, although it may occur at another time. In some examples, the uncertainty may be based at least in part on a covariance and/or may be heteroscedastic.

In some examples, the total loss, whether weighted or not, may be backpropagated through the various regression and/ or classification component of ML model, which may comprise adjusting one or more parameters of one or more of the components to minimize the total loss. Additionally or alternatively, the total loss may be backpropagated through one or more of the pipelines or a portion of a pipeline. For example, the total loss may be used to adjust one or more parameters of a top-down segmentation component, ROI component, orientation component, velocity component, and/or height component of a vision pipeline, lidar pipeline, and/or the like.

In some examples, the losses discussed herein may be determined per-object detection instead of or in addition to per-pixel loss. Determine the loss on a per-object detection basis may increase the accuracy of the ML model in determining estimated object detections for small objects. In some examples, the losses may be determined based at least in part on a ground truth comprise an indication of an object's contour, an instance segmentation identifying pixels and/or sub-pixels associated with an object, and/or the like.

In some examples, the ML model may additionally or alternatively output an indication of a track with which an estimated object is associated. In some examples, the ML model may output an embedding in association with an object detection for use in determining whether to generate a new track or associate the object detection with a former track. The embedding may be based at least in part on the other outputs of the ML model in some examples. For example, the embedding may be determined by a component of the ML model that receives the other outputs of the ML model (e.g., an ROI, object classification, estimated orientation, estimated velocity, estimated height, estimated direction), although the embedding may be additionally or alternatively determined based at least in part on outputs of one or more of the perception pipelines.

In an additional or alternate example, the ML model may be configured to output the object detections discussed herein for different height bins. For example, a first set of channels of the multi-channel output image may comprise object detections for a first height range (e.g. 0.25 meters to 2 meters), a second set of channels may comprise object detections for a second height range (e.g., 2 meters to 4 meters), and so on. Any other height intervals may be used.

At operation 432, example process 400 may comprise determining an updated (432) or new track associated with the object based at least in part on the estimated object detection, according to any of the techniques discussed herein. In some examples, operation 432 may additionally or alternatively be based at least in part on one or more former track(s) and/or estimated object detection(s). In some examples, the example process 400 may comprise determining updating every previous track currently stored in memory. Updating a track may comprise associating one of the estimated object detections with the track, indicating that the track is associated with an object that is likely partially or fully occluded (e.g., an occluded status flag may be altered), and/or retiring the track. Retiring the track may comprise indicating that an object associated with the track has been occluded for at least a threshold amount of time, the object is likely no longer within a field of view, and/or deleting the track. Once all the tracks have been updated any remaining estimated object detections that have not been associated with a track may be passed to an alternate tracking component and/or new track(s) may be generated in association therewith.

Figure 5:
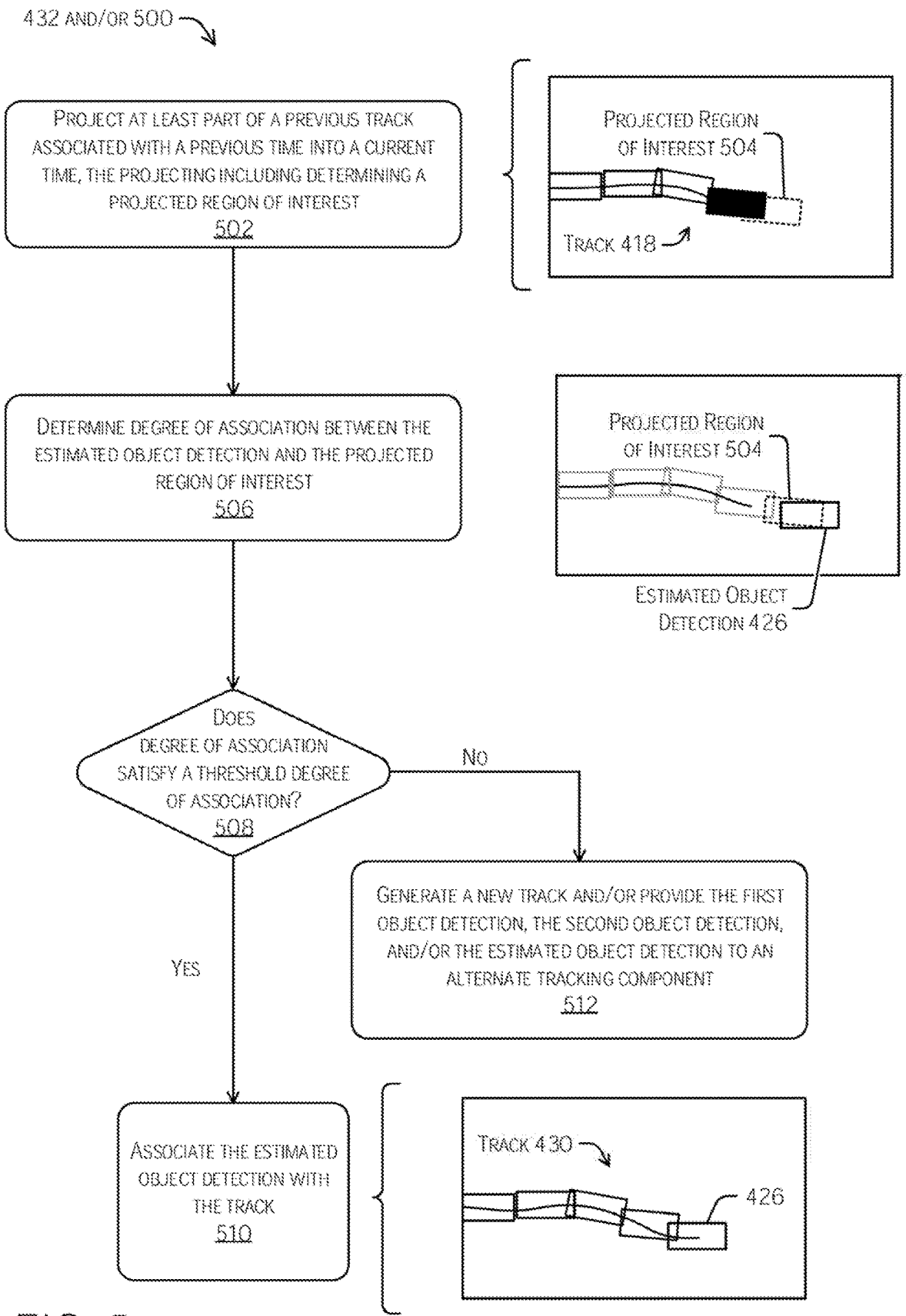
FIG. 5 illustrates a pictorial flow diagram of an example process for tracking object(s) in an environment based at least in part on an estimated object detection determined by an ML model discussed herein.

FIG. 5 illustrates a pictorial flow diagram of an example process 500 for tracking object(s) in an environment based at least in part on an estimated object detection determined by an ML model discussed herein. Example process 500 may at least part of operation 432 of example process 400 or may be an independent process. Operation 432 may comprise determining an updated or new track associated with the object based at least in part on the estimated object detection 432, according to any of the techniques discussed herein.

At operation 502, example process 500 may comprise projecting at least part of a previous track associated with a previous time into a current time, according to any of the techniques discussed herein. For example, projecting at least part of the previous track may comprise determining a projected ROI 504 based at least in part on the previous track (e.g, track 418). In some examples, the projected ROI may be based at least in part on a most recent ROI associated with the previous track 418. FIG. 5 illustrates the most recent ROI of track 418 by filling in the ROI with black shading. The projected region of interest 504 is depicted in dotted lines and may be based at least in part on historical velocit(ies), orientation(s), and/or position(s) associated with track 418. In an additional or alternate example, the projected ROI may comprise a predicted ROI output by the ML model at a previous time step.

Note that, although FIG. 5 illustrates a projected ROI 504, any of the other malleable attributes associated with an estimated object detection may be projected. For example, an object classification should not change between frames, but a velocity, orientation, height (e.g., due to a pedestrian sitting or ducking), ROI position, and/or the like may change and may be predicted/projected based at least in part on track 418 and/or data associated therewith. For example, track 418 may associated previous estimated object detections generated by the ML model and any of the data associated therewith. Therefore, although a projected ROI 504 is discussed herein, it is understood that an object classification, predicted velocity, predicted orientation, predicted height, predicted position, predicted orientation, and/or predicted embedding may be associated therewith. Determining a projected ROI 504 may comprise determining an updated/predicted embedding based at least in part on an embedding associated with the projected ROI 504 and the predicted velocity, predicted orientation, predicted height, predicted position, predicted orientation, depending on what data the embedding is based on. For example, if an embedding is based on malleable data, such as the velocity and position, the embedding may be updated, but if the embedding is based on raw sensor data and/or perception pipeline data the embedding may be used without updating.

At operation 506, example process 500 may comprise determining a degree of association between an estimated object detection and the projected ROI, according to any of the techniques discussed herein. For example, the estimated object detection may be at least a portion of an estimated object detection 426 determined by the ML model discussed herein. In some examples, operation 506 may comprise determining a score based at least in part on an IOU between the projected ROI 504 and the estimated object detection 426, a Euclidean distance between centers of the estimated object detection 426 and the projected region of interest 504 (or a former ROI), a Munkres match between the projected ROI 504 and the estimated object detection 426, and/or the like. In at least one example, determining the degree of association may comprise determining a difference (e.g., a Euclidean distance) between an embedding associated with the projected region of interest 504 and an embedding associated with the estimated object detection 426. In some examples, the embedding may take into account an object classification, size, and/or other characteristics of an object detection. The degree of association may comprise one or a combination, such as a sum or weighted sum of an IOU, distance between centers, Munkres match score, and/or distance between embeddings, in at least one example.

In some examples, the degree of association may comprise a sum or weighted sum of an IOU and a distance between embeddings. In such examples, such a sum may comprise first the IOU or the (normalized) distance may be inverted after it is computed since a high IOU indicates similarity, but a high distance between embeddings indicates dissimilarity. The IOU may be inverted by subtracting the IOU from 1. Since an IOU may range between 0 and 1 and Euclidean distance between embeddings may be significantly greater than 1, the Euclidean distance between embeddings may be normalized based at least in part on a minimum and maximum distance between embeddings in the learned embedding space. In an additional or alternate example, the logit of the IOU may be determined and scaled based at least in part on the maximum distance between embeddings in the learned embedding space. In an additional or alternate example, the degree of association may comprise a score determined based at least in part on one or more degrees of association. For example, an ML model may be trained to receive an IOU, a distance between embeddings, at least part of a track, and/or at least part of the estimated object detection data and output a score indicating a likelihood that the estimated object detection data is associated with a previous track.

At operation 508, example process 500 may comprise determining whether the degree of association satisfies a threshold degree of association, according to any of the techniques discussed herein. A degree of association that satisfies the threshold degree of association indicates that the object associated with estimated object detection 426 is/is likely the same object as indicated by track 418. If the degree of association satisfies the threshold degree of association ("Yes" prong), example process 500 may continue to operation 510. On the other hand, if the degree of association determined at operation 508 does not satisfy the threshold degree of association ("No" prong), example process 500 may continue to operation 512.

A degree of association may satisfy the threshold degree of association by meeting or exceeding a threshold IOU value if the degree of association includes an IOU, by a Munkres match being found, by a distance between embeddings being less than a threshold distance, by a distance between centers being less than a threshold distance, and/or by a combined score satisfying a threshold combined score. According to the latter example, when an IOU and a distance between embeddings are combined to determine a score, as discussed above, satisfaction of the threshold combined score may be accomplished by determining that the combined score is less than a combined score threshold when the IOU is inverted and vice versa if the distance between embeddings is normalized then inverted. In an example where multiple degrees of association are determined (e.g., an ML model-generated score, an IOU, a distance between embeddings), operation 508 may comprise a ruleset that specifies one or more of the degrees of association thresholds that must be satisfied to pass to transition to operation 510 (e.g., all the degrees of association must exceed a threshold associated with each degree of association, at least one, two of three, and so on).

At operation 510, example process 500 may comprise associating the estimated object detection 426 with the track 418 as an updated track 430, according to any of the techniques discussed herein.

At operation 512, example process 500 may comprise generating a new track associated with the estimated object detection and/or providing the first object detection, the second object detection, and/or the estimated object detection to an alternate tracking component, according to any of the techniques discussed herein. Generating a new track indicates that the estimated object detection is associated with an object that was not previously detected by any of the perception pipelines and/or was not within a field of view of the sensors associated therewith. In an additional or alternate example, the raw object detections from the one or more pipelines and/or the track 418 may be provided as input to an alternate tracking component. In some examples, the alternate tracking component may be configured to determine a new track or update a former track based at least in part on comparing object detections from multiple perception pipelines.

Example Architecture

Figure 6:
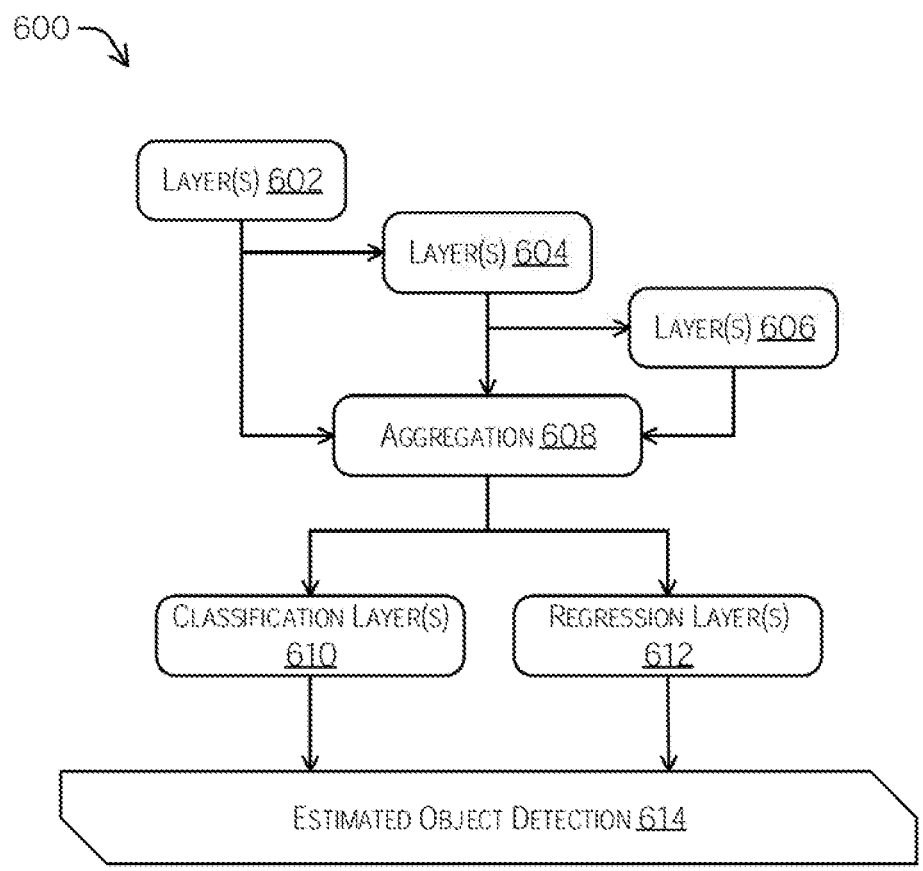
FIG. 6 illustrates a block diagram of an example architecture of an ML model for generating an estimated object detection.

FIG. 6 illustrates a block diagram of an example architecture 600 of the ML model discussed herein for generating an estimated object detection. In some examples, the example architecture 600 may be associated with one object classification or multiple object classifications. In other words, the example architecture 600 may receive and/or be trained on object detections associated with a particular object classification or the example architecture 600 may receive and/or be trained on object detections of various types of object classifications. In an example where the example architecture 600 is associated with one object classification the ML model may comprise multiple instances of the example architecture 600 trained in association with the different object classifications.

Regardless, example architecture 600 may comprise a first set of layer(s) 602, a second set of layer(s) 604, and/or a third set of layer(s) 606, although an additional or alternate number of sets of layers may be used. A layer may be a portion of an ML model, a subnetwork, and/or a distinct network. In at least one example at least one of the set(s) of layers 602-606 may comprise one or more convolutional layers, which may comprise learned parameters tuned based at least in part on the losses discussed above, and/or a deconvolutional layer (e.g., to upsample the inputs thereto). In some examples, the multi-channel image discussed above may be provided as input to any one or more of the first set of layer(s) 602, the second set of layer(s) 604, and/or the third set of layer(s) 606. As discussed above, the multi-channel image may comprise data from a current and/or previous time steps. In some examples, output of the first set of layer(s) 602 may be provided as input to an aggregation layer 608 and to the second set of layer(s) 604; output of the second set of layer(s) 604 may be provided as input to the aggregation layer 608 and to the third set of layer(s) 606; and output of the third set of layer(s) 606 may be provided as input to the aggregation layer 608.

In some examples, the aggregation layer 608 may concatenate or upsample and element-wise sum the outputs of the respective layers to form a data structure. In some examples, the data structure generated by the aggregation layer 608 may be provided as input to classification layer(s) 610 and/or regression layer(s) 612. The classification layer(s) 610 may comprise one or more sets of convolutional layers or other components for the classification tasks discussed herein. In some examples, an output layer of a classification task may output a tensor (or other data structure) of likelihoods, where a discrete portion of the field indicates a likelihood that an associated portion of the environment is associated with a classification (e.g., occupied space, object classification, velocity bin, orientation bin, height bin). For example, a first set of layers of the classification layer(s) 610 may determine whether respective portions of the environment are occupied or unoccupied and/or associated with a respective object classification, another set of layers of the classification layer(s) 610 may determine whether the environment is associated with an estimated height bin, and so on. In some examples, a discrete portion of the set of object classification layer(s) may additionally or alternatively include a likelihood associated with each of the object classifications upon which the example ML architecture 600 has been trained. In other words, a classification output head may output a binary indication that a portion of the environment is or isn't associated with a class (e.g., height bin, object classification, occupancy) or the classification output head may output a regressed value, to which an NMS algorithm may be applied to determine the classification. An output layer of the regression layer(s) 612 may output a field of values for those tasks that are being regressed, such as ROI center offset, ROI extent, velocity offset, orientation offset, height offset, and/or the like.

The various outputs of the classification layer(s) 610 and/or regression layer(s) 612 may be aggregated into the estimated object detection 614. For example, this may comprise subtracting an offset from a bin value, determining an ROI based at least in part on non-maximum suppression technique applied to classification and/or regression outputs, determining that two or more ROIs are associated with articulated object based at least in part on the center offsets associated with the two or more ROIs and grouping the two or more ROIs into a single object detection, normalizing the outputs, and/or formatting the outputs into a common object detection format, such as a message for transmission on publish-subscribe network. In examples where a classification output comprises a bin and a regressed output comprises an offset, such as may be used for yaw, yaw rate, height, velocity, acceleration, object extents, and/or the like, the classification may indicate a bin, which may be a range of values (e.g., 0 to 5 meters, 0 to 10 miles per hour) and the (regressed) offset may specify a positive or negative value to be subtracted from a reference point of the bin. For example, the reference point may be a center value of the bin (e.g., 3 meters in a bin specifying a range of 0 to 5 meters) or an end of the bin (e.g., 0 meters or 5 meters in a bin specifying a range between 0 to 5 meters). Note that a pose indicated as part of the data structure output by the ML model discussed herein may comprise a position, center, and/or orientation of an object (e.g., the orientation may comprise the yaw). In some examples, the pose may additionally or alternatively comprise extents of the object.

Example Clauses

A. A method comprising: receiving a first object detection associated with a first sensor type and a second object detection associated with a second sensor type, the first object detection and the second object detection identifying an object in an environment surrounding an autonomous vehicle; receiving a track associated with the object, the track identifying at least one of an estimated previous position of the object, a previous region of interest, or a previous velocity of the object; inputting the first object detection, the second object detection, and at least part of the track into a machine-learning (ML) model; receiving, from the ML model, a data structure comprising a region of interest, object classification, and a pose associated with the object, the pose indicating at least one of a position or a yaw associated with the object; determining an updated track associated with the object based at least in part on the data structure, the updated track comprising at least a portion of the track, a current position, and at least one of the region of interest or the yaw associated with the object; and controlling the autonomous vehicle based at least in part on the updated track.

B. The method of paragraph A, wherein the data structure additionally comprises at least one of an indication that the object is stationary or dynamic, a top-down segmentation of the environment, a yaw rate, a velocity associated with the object, or an acceleration associated with the object.

C. The method of either paragraph A or B, wherein determining the updated track comprises: determining a degree of alignment of the region of interest to the previous region of interest; and determining that the degree of alignment meets or exceeds the threshold degree of alignment.

D. The method of any one of paragraphs A-C, wherein the first object detection and the second object detection comprise initial estimates associated with the object and the data structure comprises one or more refined estimates associated with the object.

E. The method of any one of paragraphs A-D, further comprising: receiving a first prior object detection associated with a time previous to a time at which the first object detection was generated; receiving a second prior object detection associated with a time previous to a time at which the second object detection was generated; and inputting the first prior object detection and the second prior object detection to the ML model in addition to the first object detection, the second object detection, and the track.

F. The method of any one of paragraphs A-E, wherein inputting the first object detection, the second object detection, and at least part of the track comprises: generating a multi-channel image based at least in part on the first object detection, the second object detection, and at least part of the track; and inputting the multi-channel image to the ML model.

G. A system comprising: one or more processors; and a memory storing processor-executable instructions that, when executed by the one or more processors, cause the system to perform operations comprising: receiving a first output and a second output; receiving a track associated with an object in an environment, the track identifying at least one of an estimated previous position of the object, a previous region of interest, or a previous velocity of the object; inputting the first output, the second output, and at least part of the track into a machine-learning (ML) model; receiving, from the ML model, a data structure comprising a region of interest, object classification, and a pose associated with the object, the pose indicating at least one of a position or a yaw associated with the object; and determining an updated track associated with the object based at least in part on the data structure, the updated track comprising at least a portion of the track, a current position, and at least one of the region of interest or the yaw associated with the object.

H. The system of paragraph G, wherein the operations further comprise controlling an autonomous vehicle based at least in part on the updated track.

I. The system of either paragraph G or H, wherein the first output comprises an initial estimate associated with the object and the data structure comprises a refined estimate associated with the object.

J. The system of any one of paragraphs G-I, wherein the data structure additionally comprises at least one of an indication that the object is stationary or dynamic, a top-down segmentation of the environment, a yaw rate, a velocity associated with the object, or an acceleration associated with the object.

K. The system of any one of paragraphs G-J, wherein: the first output is an output of a first perception pipeline; the second output is an output of a second perception pipeline; a third output indicates that a portion of the environment associated with the first output and the second output is unoccupied; and the third output is provided as input to the ML model in addition to the first output and the second output.

L. The system of any one of paragraphs G-K, wherein determining the updated track comprises: determining a degree of alignment of the region of interest to the previous region of interest; and determining that the degree of alignment meets or exceeds the threshold degree of alignment.

M. The system of any one of paragraphs G-L, wherein at least one of the first output or the second output comprises at least one of: a representation of the environment from a top-down perspective; an indication that a portion of the environment is occupied; a representation of an occluded portion of the environment; a region of interest associated with the object; a classification associated with the object; a sensor data segmentation; a three-dimensional discretized representation of sensor data; a yaw associated with the object; a yaw rate associated with the object; a ground height estimation; a set of extents associated with the object; a velocity associated with the object; or an acceleration associated with the object.

N. The system of any one of paragraphs G-M, wherein the operations further comprise: receiving a first prior environment representation associated with a time previous to a time at which the first output was generated, wherein the first prior environment representation is associated with a first perception pipeline; receiving a second prior environment representation associated with a time previous to a time at which the second output was generated, wherein the first prior environment representation is associated with a first perception pipeline; and inputting the first prior environment representation and the second prior environment representation to the ML model in addition to the first output, the second output, and the track.

O. The system of any one of paragraphs G-N, wherein inputting the first output, the second output, and at least part of the track comprises generating a multi-channel image based at least in part on the first output, the second output, and at least part of the track.

P. A non-transitory computer-readable medium storing processor-executable instructions that, when executed by one or more processors, cause the one or more processors to perform operations comprising: receiving a first output associated with a first process and a second output associated with a second process; receiving a track associated with an object in an environment, the track identifying at least one of an estimated previous position of the object, a previous region of interest, or a previous velocity of the object; inputting the first output, the second output, and at least part of the track into a machine-learning (ML) model; receiving, from the ML model, a data structure comprising a region of interest, object classification, and a pose associated with the object, the pose indicating at least one of a position or a yaw associated with the object; and determining an updated track associated with the object based at least in part on the data structure, the updated track comprising at least a portion of the track, a current position, and at least one of the region of interest or the yaw associated with the object.

Q. The non-transitory computer-readable medium of paragraph P, wherein the first output comprises an initial estimate associated with the object and the data structure comprises a finalized estimate associated with the object.

R. The non-transitory computer-readable medium of either paragraph P or Q, wherein the data structure additionally comprises at least one of an indication that the object is stationary or dynamic, a top-down segmentation of the environment, a yaw rate, a velocity associated with the object, or an acceleration associated with the object.

S. The non-transitory computer-readable medium of any one of paragraphs P-R, wherein at least one of the first output or the second output comprises at least one of: a representation of the environment from a top-down perspective; an indication that a portion of the environment is occupied; a representation of an occluded portion of the environment; a region of interest associated with the object; a classification associated with the object; a sensor data segmentation; a three-dimensional discretized representation of sensor data; a yaw associated with the object; a yaw rate associated with the object; a ground height estimation; a set of extents associated with the object; a velocity associated with the object; or an acceleration associated with the object.

T. The non-transitory computer-readable medium of any one of paragraphs P-S, wherein inputting the first output, the second output, and at least part of the track comprises generating a multi-channel image based at least in part on the first output, the second output, and at least part of the track.

U. An autonomous vehicle comprising the system of any one of paragraphs G-O.

V. A system comprising: one or more processors; and a memory storing processor-executable instructions that, when executed by the one or more processors, cause the system to perform operations comprising: the method of any one of paragraphs A-F.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving a first object detection associated with a first sensor type and a second object detection associated with a second sensor type, the first object detection and the second object detection identifying an object in an environment surrounding an autonomous vehicle;
determining, based at least in part on previous sensor data, a previous track associated with the object, the previous track identifying at least one of an estimated previous position of the object, a previous region of interest, or a previous velocity of the object;
inputting the first object detection, the second object detection, and at least part of the previous track into a machine learning (ML) model;
receiving, from the ML model, a data structure comprising a region of interest, object classification, and a pose associated with the object, the pose indicating at least one of a position or a yaw associated with the object;
determining, based at least in part on the data structure, a new track associated with the object wherein the new track indicates that the object detected in the previous sensor data is a same object detected in current sensor data;

updating, based at least in part on the data structure, one or more previous tracks by retiring the one or more previous tracks, wherein retiring the one or more previous tracks comprises indicating that the object associated with the one or more previous tracks has been occluded for a threshold amount of time; and controlling the autonomous vehicle based at least in part on the new track.

2. The method of claim 1, wherein the data structure additionally comprises at least one of an indication that the object is stationary or dynamic, a top-down segmentation of the environment, a yaw rate, a velocity associated with the object, or an acceleration associated with the object.

3. The method of claim 1, wherein determining the new track comprises:
determining a degree of alignment of the region of interest to the previous region of interest; and
determining that the degree of alignment meets or exceeds a threshold degree of alignment.

4. The method of claim 1, further comprising:
receiving a first prior object detection associated with a first time previous to a second time at which the first object detection was generated;
receiving a second prior object detection associated with a third time previous to a fourth time at which the second object detection was generated; and
inputting the first prior object detection and the second prior object detection to the ML model in addition to the first object detection, the second object detection, and the previous track.

5. The method of claim 1, wherein inputting the first object detection, the second object detection, and at least part of the previous track comprises:
generating a multi-channel data structure based at least in part on the first object detection, the second object detection, and at least part of the previous track, wherein generating the multi-channel data structure comprises encoding attributes associated with the environment into channels of the multi-channel data structure based at least in part on the first object detection, the second object detection, and at least part of the previous track; and
inputting the multi-channel data structure to the ML model.

6. The method of claim 1, wherein:
the first object detection is based at least in part on sensor data that has a first perspective of the environment;
the data structure indicates a top-down perspective of the environment; and
the top-down perspective is different than the first perspective.

7. The method of claim 1, further comprising reducing, based at least in part on comparing object detections from each of multiple different sensor modalities to the previous track, jitter associated with the new track.

8. The method of claim 1, wherein updating the one or more previous tracks further comprises at least one of associating one or more of the first object detection or the second object detection with the one or more previous tracks or indicating that the one or more previous tracks associated with an object is partially or fully occluded.

9. A system comprising:
one or more processors; and
a memory storing processor-executable instructions that, when executed by the one or more processors, cause the one or more processors to perform operations comprising:
receiving first sensor data and second sensor data;
inputting the first sensor data to a first perception pipeline and inputting the second sensor data to a second perception pipeline;
receiving a first output from the first perception pipeline based at least in part on the first sensor data and a second output from the second perception pipeline, the first output and the second output identifying an object in an environment;
receiving a previous track associated with the object in the environment, the previous track identifying at least one of an estimated previous position of the object, a previous region of interest, or a previous velocity of the object;
inputting the first output, the second output, and at least part of the previous track into a machine-learning (ML) model;
receiving, from the ML model, a data structure comprising a region of interest, object classification, and a pose associated with the object, the pose indicating at least one of a position or a yaw associated with the object;
determining an updated track associated with the object based at least in part on the data structure, a current position, and at least one of the region of interest or the yaw associated with the object; and
updating, based at least in part on the data structure, one or more previous tracks by retiring the one or more previous tracks, wherein retiring the one or more previous tracks comprises indicating that the object associated with the one or more previous tracks has been occluded for a threshold amount of time.

10. The system of claim 9, wherein the data structure additionally comprises at least one of an indication that the object is stationary or dynamic, a top-down segmentation of the environment, a yaw rate, a velocity associated with the object, or an acceleration associated with the object.

11. The system of claim 9, wherein:
a third output indicates that a second portion of the environment associated with the first output and the second output is unoccupied; and
the third output is provided as input to the ML model in addition to the first output and the second output.

12. The system of claim 9, wherein determining the updated track comprises:
determining a degree of alignment of the region of interest to the previous region of interest; and
determining that the degree of alignment meets or exceeds a threshold degree of alignment.

13. The system of claim 9, wherein at least one of the first output or the second output comprises at least one of:
a first representation of the environment from a top-down perspective;
an indication that a second portion of the environment is occupied;
a second representation of an occluded portion of the environment;
a second region of interest associated with the object;
a classification associated with the object;
a sensor data segmentation;
a three-dimensional discretized representation of sensor data;
a yaw associated with the object;
a yaw rate associated with the object;
a ground height estimation;
a set of extents associated with the object;
a velocity associated with the object; or
an acceleration associated with the object.

14. The system of claim 9, wherein the operations further comprise:
- receiving a first prior environment representation associated with a first time previous to a second time at which the first output was generated, wherein the first prior environment representation is associated with the first perception pipeline;
- receiving a second prior environment representation associated with a third time previous to a fourth time at which the second output was generated, wherein the second prior environment representation is associated with the second perception pipeline; and
- inputting the first prior environment representation and the second prior environment representation to the ML model in addition to the first output, the second output, and the previous track.

15. The system of claim 9, wherein inputting the first output, the second output, and at least part of the previous track is based at least in part on:
- generating a multi-channel data structure based at least in part on the first output, the second output, and at least part of the previous track.

16. The system of claim 15, wherein generating the multi-channel data structure is based at least in part on projecting the first output, the second output, and at least part of the previous track into the multi-channel data structure.

17. The system of claim 16, wherein the multi-channel data structure comprises first region of interest data associated with the first output and a second region of interest data associated with the second output.

18. The system of claim 9, wherein the updated track is associated with a first time, which is current or previous, and the previous track is associated with a second time prior to the first time.

19. A non-transitory computer-readable medium storing processor-executable instructions that, when executed by one or more processors, cause the one or more processors to perform operations comprising:
- receiving a first output associated with a first process and a second output associated with a second process;
- receiving a previous track associated with an object in an environment, the previous track identifying at least one of an estimated previous position of the object, a previous region of interest, or a previous velocity of the object;
- generating a multi-channel data structure based at least in part on the first output, the second output, and at least part of the previous track;
- inputting the multi-channel data structure into a machine-learning (ML) model;
- receiving, from the ML model, a data structure comprising a region of interest, object classification, and a pose associated with the object, the pose indicating at least one of a position or a yaw associated with the object;
- determining an updated track associated with the object based at least in part on the data structure, the updated track comprising at least a current position, and at least one of the region of interest or the yaw associated with the object; and
- updating, based at least in part on the data structure, one or more previous tracks by retiring the one or more previous tracks, wherein retiring the one or more previous tracks comprises indicating that the object associated with the one or more previous tracks has been occluded for a threshold amount of time.

* * * * *